US007891459B2

(12) United States Patent  
Lech et al.

(10) Patent No.: US 7,891,459 B2
(45) Date of Patent: Feb. 22, 2011

(54) MULTIPLE RATIO STEERING FOR LOADER

(75) Inventors: Richard J. Lech, Burlington, IA (US); Roger D. Mickelson, West Burlington, IA (US)

(73) Assignee: CNH America LLC, New Holland, PA (US)

( * ) Notice: Subject to any disclaimer, the term of this patent is extended or adjusted under 35 U.S.C. 154(b) by 608 days.

(21) Appl. No.: 11/755,324

(22) Filed: May 30, 2007

(65) Prior Publication Data

US 2008/0006468 A1    Jan. 10, 2008

Related U.S. Application Data

(60) Provisional application No. 60/818,923, filed on Jul. 6, 2006.

(51) Int. Cl.
*B62D 5/08* (2006.01)

(52) U.S. Cl. .......................... 180/441; 180/421

(58) Field of Classification Search ............. 180/403, 180/405, 406, 423, 421, 441; 60/384
See application file for complete search history.

(56) References Cited

U.S. PATENT DOCUMENTS

| | | | |
|---|---|---|---|
| 3,249,174 A | 5/1966 | Orwig | |
| 3,439,768 A | 4/1969 | Medley | |
| 3,564,848 A | 2/1971 | Baatrup et al. | |
| 3,688,860 A | 9/1972 | Molby | |
| 4,034,825 A | 7/1977 | Adams | |
| 4,293,051 A | 10/1981 | Nishikawa | |
| 4,400,938 A | 8/1983 | Ohe | |
| 4,470,260 A * | 9/1984 | Miller et al. | .............. 60/422 |
| 4,640,380 A | 2/1987 | Daido et al. | |
| 4,765,427 A | 8/1988 | Yonker | |
| 5,634,527 A | 6/1997 | Emori | |
| 6,131,687 A | 10/2000 | Leidinger et al. | |
| 6,318,078 B1 | 11/2001 | Novaceck et al. | |
| 6,544,018 B2 | 4/2003 | Heckel et al. | |
| 2009/0199915 A1* | 8/2009 | Novacek et al. | ........ 137/625.23 |

OTHER PUBLICATIONS

Eaton Corporation, Catalog C-STOV-MC001-E Jan. 2003, pp. 20, 32, 34.

* cited by examiner

*Primary Examiner*—Tony H. Winner
(74) *Attorney, Agent, or Firm*—Patrick M. Sheldrake; John William Stader; Michael G. Harms

(57) ABSTRACT

A multiple-speed steering system for an off-road vehicle having a loading mechanism and a hydraulic steering system associated with guiding the vehicle. The multiple-speed steering system includes a hydraulic steering cylinder and a first component fluidly coupled to the steering cylinder to provide a primary metered flow of hydraulic fluid to the steering cylinder. A second component is selectively fluidly coupled to the steering cylinder to provide a supplemental metered flow in addition to the primary metered flow of hydraulic fluid to the steering cylinder. Addition of the supplemental metered flow is selectable by an operator of the vehicle.

20 Claims, 8 Drawing Sheets

MULTIPLE RATIO STEERING FOR LOADER

FIELD OF THE INVENTION

The present invention relates generally to off-road vehicles and, more particularly, to off-road vehicles having steering assist requiring a reduced magnitude of movement of a steering device associated with an amount of directional change of the vehicle.

BACKGROUND OF THE INVENTION

Loaders, which include a class of machinery referred to as tractor loader-backhoes or TLBs, are often used in conjunction with dump trucks. In a typical loader arrangement, as shown in FIG. 1, the loader is usually directed into a pile of material to load a bucket of the loader with the material, with the position of the loader depicted as position 1 or P1. After the bucket is loaded with the material, the loader is then placed in reverse gear to back away from the pile toward a position 2 or P2. While executing the backing maneuver from P1 to P2, the operator manipulates the steering device of the wheel loader toward one extreme turning position, also referred to as a lock or lock position, in order to be "lined up" with the dump truck. Typically, the steering device is a steering wheel, and manipulation of the steering wheel is achieved by rotating the steering wheel. However, in order for the operator to be able to move the loader from P2 to P3, the operator must then rotate the steering wheel from the lock position to a center position. Once the loader empties the contents of the bucket into the dump truck at P3, the operator places the loader in reverse gear to move from P3 toward P4. While executing the backing maneuver from P3 to P4, the operator rotates the steering wheel toward a lock or lock position, in order for the loader to be "lined up" with the pile of material. Upon reaching P4, the operator must once again rotate the steering wheel from the lock position to a position before the loader can be directed toward P1 to repeat the process.

Loaders are typically configured to require the operator to rotate the steering wheel six revolutions to steer the loader from one extreme turning position to the other extreme turning position, often referred to as a "lock to lock" maneuver. In other words, for one loading sequence, i.e., moving the loader from P1 to P4, the loader operator must rotate the steering wheel a total of 12 revolutions. Since loader operators must perform the loading sequence many times in a work shift, such extreme repetitive steering movements become physically exhausting for the operator.

Although known steering assist constructions can reduce the number of steering wheel rotations required to achieve an amount of steering change, such as a "lock to lock" movement, such constructions can become awkward, as the operator looses "feel" of the steering.

One steering assist construction, U.S. Pat. No. 6,318,078, is shown diagrammatically in FIGS. 2 and 3. FIG. 2 is directed to metered flow system, while FIG. 3 is directed to a non-metered flow system. As shown in FIG. 2, fluid flows from a source 30 through a line 26, a valve 12, a line 34 and to a gerotor 14, which meters pressurized fluid back through a line 36, valve 12 and then through a line 38 to a steering cylinder 18.

In the non-metered system of FIG. 3 of U.S. Pat. No. 6,318,078, a solenoid valve 20 is activated so that pressurized fluid from source 30 flows through valve 20 through line 34 to actuate a valve 22 so that gerotor 14 is isolated from the rest of the system. That is, pressurized fluid from source 30 flows through line 26, valve 12, line 34 then to line 36 by valve 22, back through valve 12 and then through line 38 to steering cylinder 18. The steering system shown in FIG. 3 acts like a valve instead of a metering unit. That is, in response to a slight actuation or turn of the steering wheel, non-metered pressurized fluid is provided to steering cylinder 18, causing the piston in the steering cylinder to actuate and continue to actuate until the piston reaches the end of its travel or the steering wheel is centered.

In this type of steering, the user controls only the direction of piston movement within the steering cylinder 18, instead of the amount of travel of the piston within the steering cylinder movement as in metered steering. Stated another way, slightly turning and retaining the steering wheel in one direction from the centered position, the wheels are steered toward a corresponding maximum left hand or right hand turn. If system pressure at source 30 is lost for the system of FIG. 3, valve 22 returns to a first position (see FIG. 2) due to the spring in the valve overcoming the fluid force in line 34, and gerotor 14 is again in fluid communication with the system to provide metered flow to the steering cylinder 18. In other words, in such a circumstance, also referred to as an emergency steering mode, the construction of U.S. Pat. No. 6,318,078 shifts from operating as shown in FIG. 3 to operating as shown in FIG. 2.

In summary, while the steering construction of U.S. Pat. No. 6,318,078 may provide non-metered steering assist (FIG. 3), the operator cannot typically control the amount of directional steering change provided, since the operator cannot view the final angular position of the wheels or track of the loader. In other words, this construction does not provide a controlled steering assist construction.

Shown diagrammatically in FIGS. 7 and 8 is a dual displacement steering system produced by Eaton Corporation that includes a pilot line 40 between a source of pressurized fluid source 30 and a valve 22 that provides metered fluid from gerotors 14, 16 to steering cylinder 18 via line 32. In this steering system arrangement, so long as fluid is provided by pressurized fluid source 30, fluid is metered by both gerotors 14, 16, resulting in fewer turns of a steering wheel to achieve "lock to lock" movement. However, this steering system arrangement does not permit the operator to reduce the responsiveness of the steering system by selectively isolating one of gerotor 14 or gerotor 16 from the system. In the case pressurized fluid source 30 becomes non-operational during operation of the loader, constituting an emergency situation outside the control of the operator, as shown in FIG. 8, gerotor 16 is isolated from the steering system, leaving only gerotor 14 to provide metered flow of fluid to streering cylinder 18 to provide steering for the loader. It should be noted in this operation, the displacement of the dual gerotor is sized for normal operation, including high-speed operations or "roading", while the single gerotor is sized for emergency manual steering.

As background, a "hand pump" serves as the steering device for hydraulic steering machines, which is common for construction equipment and agricultural equipment. This is different than the automotive sector, in that the automotive sector vehicles have a direct mechanical link between the steering wheel and the steering axle; whereas hydraulic steering simply has a hydraulic connection.

The steering wheel is attached to a shaft in the hand pump, which connects to a hydraulic valve and a gerotor. The gerotor and the steering wheel are typically linked to provide a "one-to-one" relationship in rotation. That is, one turn of the steering wheel correlates to one turn of the gerotor. Typically, there is a spring arrangement inside the hand pump, which allows a slight movement (approximately 15 degree steering wheel rotation) before the system requires manual force to effect steering, and it is then a direct "one-to-one" link. Under normal power operations, the steering wheel will lead the gerotor a few degrees, until the power from the hydraulic valve is metered through the gerotor, and to the cylinder. Even with the spring arrangement, the system remains a "one to one" relationship between the steering wheel and gerotor.

When hydraulic power is lost, then the steering system is controlled by manual power. This is why the steering valve is sometimes referred to as the "hand pump". When the power pump supply is lost, oil is available in the hand pump through an anti-cavitation check valve in the inlet, so the hand pump can generate the pressure. For example, if there was a void in the system, it would be impossible to generate hydraulic pressure in the steering system. Not surprisingly, the larger the gerotor, the greater the turning force that must be applied to the steering wheel to generate a given pressure required by the steering cylinder in order to steer the vehicle. The industry has a guideline on a maximum steering wheel turning force that is acceptable for providing vehicle emergency steering, which is required while a vehicle is driven through a given course.

The existing Eaton dual gerotor is configured for use during emergency steering. As vehicle weights increase, the fluid pressure required to steer them increases, and thus, the force required to effect manual steering likewise increases. However, as noted above, the Eaton construction does not provide selectable multiple ratio steering.

Therefore, what is needed is a steering assist construction selectably controllable by an operator that can reduce the number of steering wheel revolutions required to achieve a predetermined amount of directional change, such as a "lock to lock", in a dump truck loading configuration, but maintain the higher number of "lock to lock" controlled steering wheel rotations when the loader is not used in a dump truck loading configuration.

SUMMARY OF THE INVENTION

The present invention relates to a multiple-speed steering system for an off-road vehicle having a loading mechanism and a hydraulic steering system associated with guiding the vehicle. The multiple-speed steering system includes a hydraulic steering cylinder and a first component fluidly coupled to the steering cylinder to provide a primary metered flow of hydraulic fluid to the steering cylinder. A second component is selectively fluidly coupled to the steering cylinder to provide a supplemental metered flow in addition to the primary metered flow of hydraulic fluid to the steering cylinder. Addition of the supplemental metered flow is selectable by an operator of the vehicle.

The present invention further relates to a method for providing multiple-speed steering assist to an off-road vehicle having a loading mechanism, the vehicle having a hydraulic steering system associated with guiding the vehicle, including a hydraulic steering cylinder. The method includes providing a first component fluidly coupled to the steering cylinder to provide a primary metered flow of hydraulic fluid to the steering cylinder. The method further includes providing a second component selectively fluidly coupled to the steering cylinder to provide a supplemental metered flow in addition to the primary metered flow of hydraulic fluid to the steering cylinder. The method further includes selectably requesting addition of the supplemental metered flow.

The present invention yet further relates to a multiple-speed steering system for an off-road vehicle having a loading mechanism and a hydraulic steering system associated with guiding the vehicle. The multiple-speed steering system includes a hydraulic steering cylinder and a first pump fluidly coupled to the steering cylinder to provide a primary metered flow of hydraulic fluid to the steering cylinder. A second pump is selectively fluidly coupled to the steering cylinder to provide a supplemental metered flow in addition to the primary metered flow of hydraulic fluid to the steering cylinder. Addition of the supplemental metered flow is selectable by an operator of the vehicle.

The present invention further relates to a steering system for an off-road vehicle having a loading mechanism and a hydraulic steering system associated with guiding the vehicle and including a hydraulic steering cylinder. The system includes a first steering ratio for use with a first mode of operation of the vehicle, the first steering ratio corresponding to a first metered flow of fluid produced by a metering mechanism and transmitted to the steering cylinder. The first steering ratio defines an amount of movement of a steering device corresponding to an amount of change of direction of the vehicle, the magnitude of the change of direction capable of being less than lock to lock movement. A second steering ratio is for use with a second mode of operation of the vehicle, the second steering ratio corresponding to a second metered flow of fluid produced by the metering mechanism and transmitted to the steering cylinder. The second metered flow of fluid is greater than the first metered flow of fluid, the second steering ratio defining an amount of movement of the steering device corresponding to an amount of change of direction of the vehicle. The magnitude of the change of direction is capable of being less than lock to lock movement.

An advantage of an embodiment of the present invention is that a loader operator's physical burdens associated with repetitive loader movements can be significantly reduced.

A further advantage of an embodiment of the present invention is that the loader operator can selectively choose to apply the steering assist during certain loader operating mode(s).

A still further advantage of an embodiment of the present invention is that the steering assist cannot be applied by the loader operator during certain operating mode(s).

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Referring to the diagrammatic drawings 4-6, a description of a system for providing steering assist to an off-road vehicle having a bucket (not shown) or other loading mechanism and a hydraulic system 10 having a steering device (not shown) associated with guiding the vehicle is provided. Loading mechanism can include fork tines or other lifting or grappling apparatus disposed in the front end of the vehicle. The steering device is capable of changing a direction of travel of the vehicle, and can be used for articulated vehicles. That is, articulated vehicles include vehicles having two hinged segments, such as a front portion and a back portion, the steering provided by actuation of a hydraulic cylinder connecting each of the portions, causing rotational movement of the front portion with respect to the rear portion.

Figure 1:
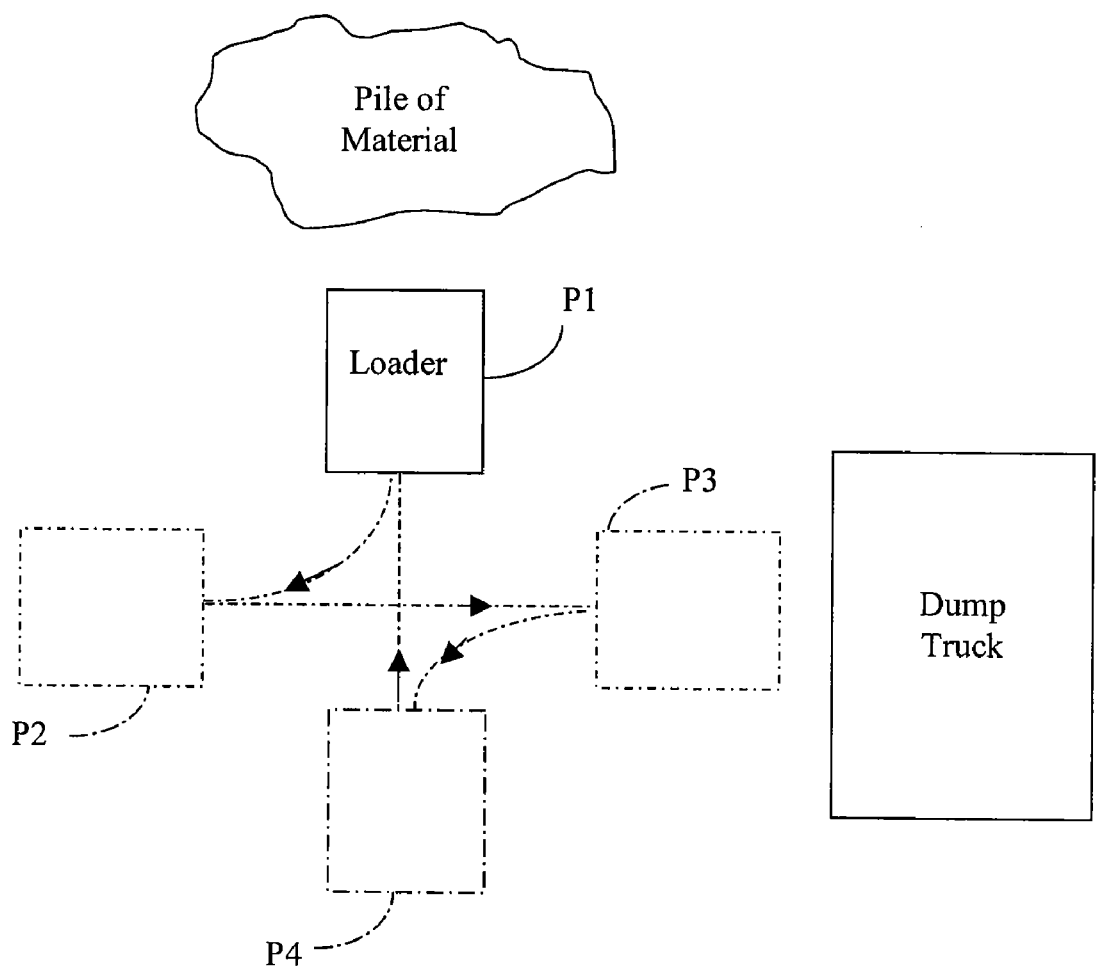
FIG. 1 is schematic view of a vehicle in an arrangement employing an embodiment of the present invention.
Figure 2:
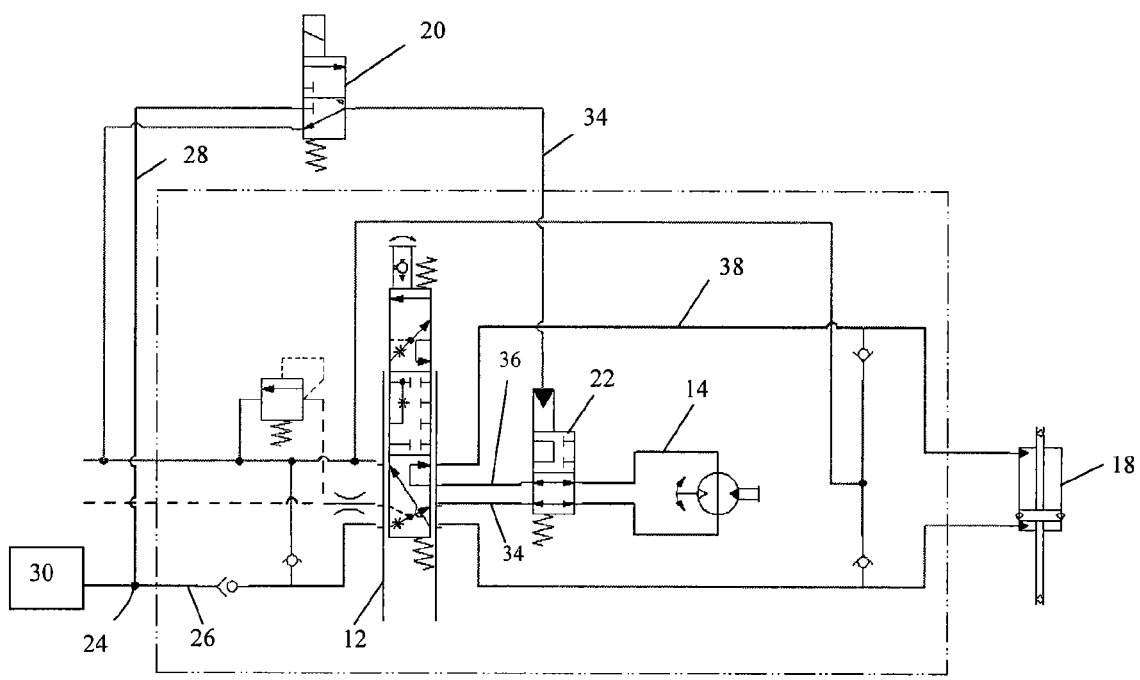
FIGS. 2 and 3 are diagrammatic views of a prior art steering system construction.
Figure 3:
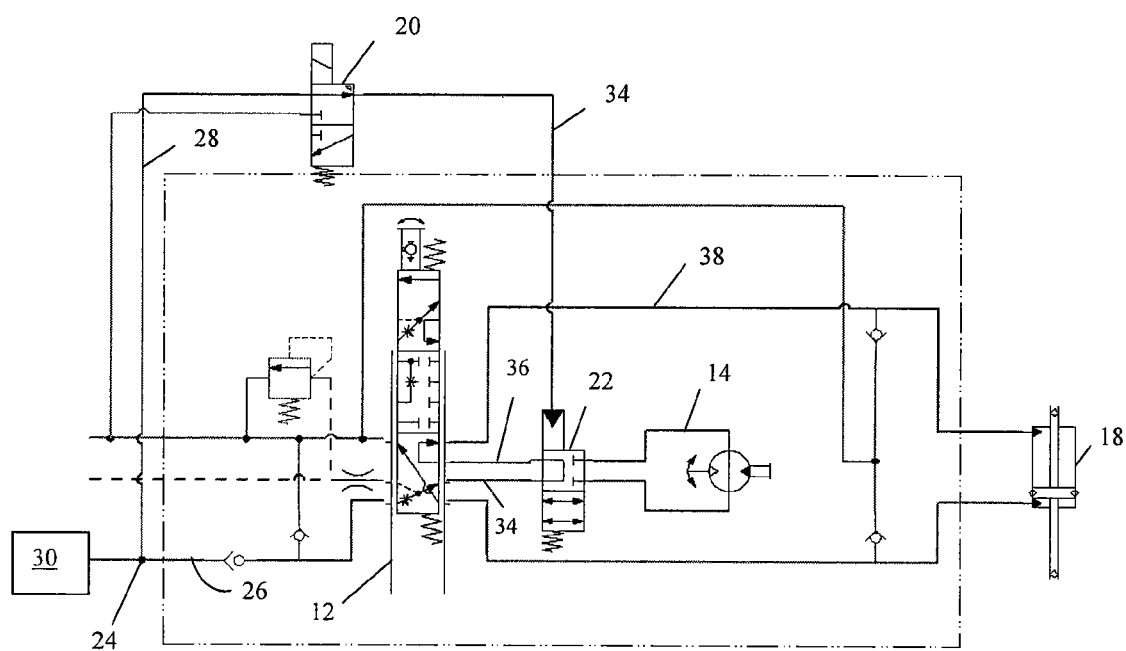
Figure 4:
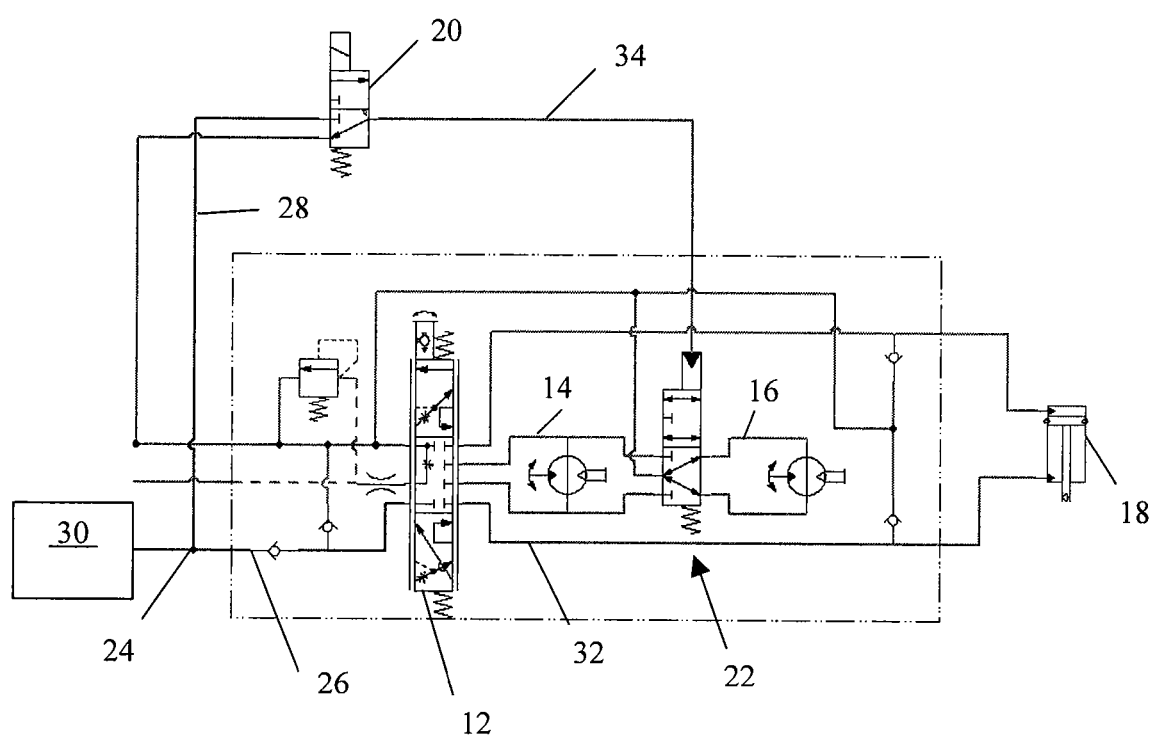
FIG. 4 is a diagrammatic view showing an embodiment of a portion of a hydraulic system in which the present invention is employed, but the hydraulic system steering is not under load.
Figure 5:
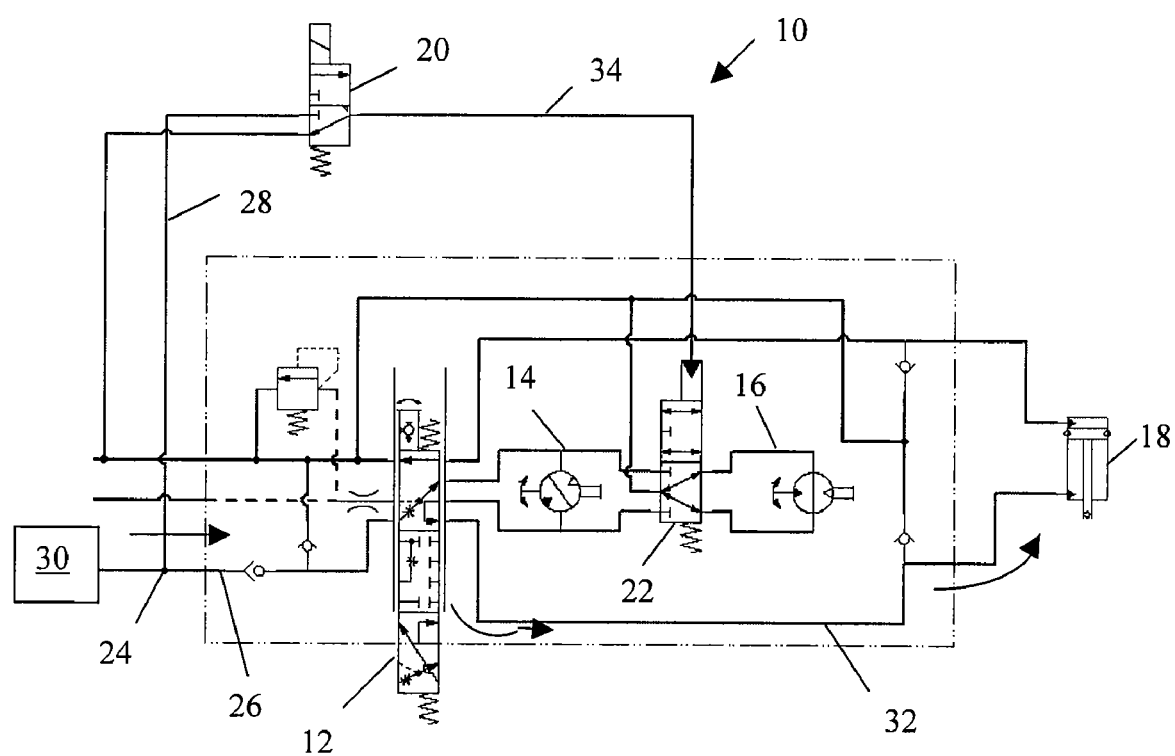
FIG. 5 is a diagrammatic view showing an embodiment of a portion of a hydraulic system in which the present invention is employed, the normally configured portion of the hydraulic system steering is activated, but not the steering assist of the present invention.
Figure 6:
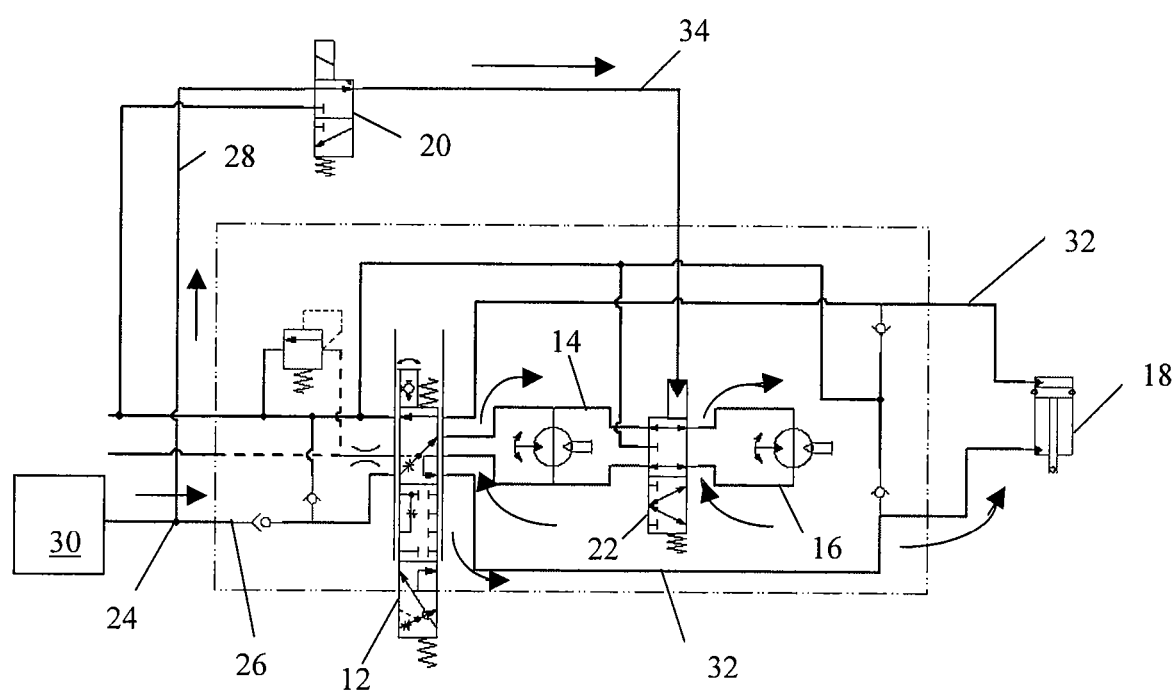
FIG. 6 is a diagrammatic view showing an embodiment of a portion of a hydraulic system in which the present invention is employed, with both the normally configured portion of the hydraulic system and the steering assist of the present invention under load.
Figure 7:
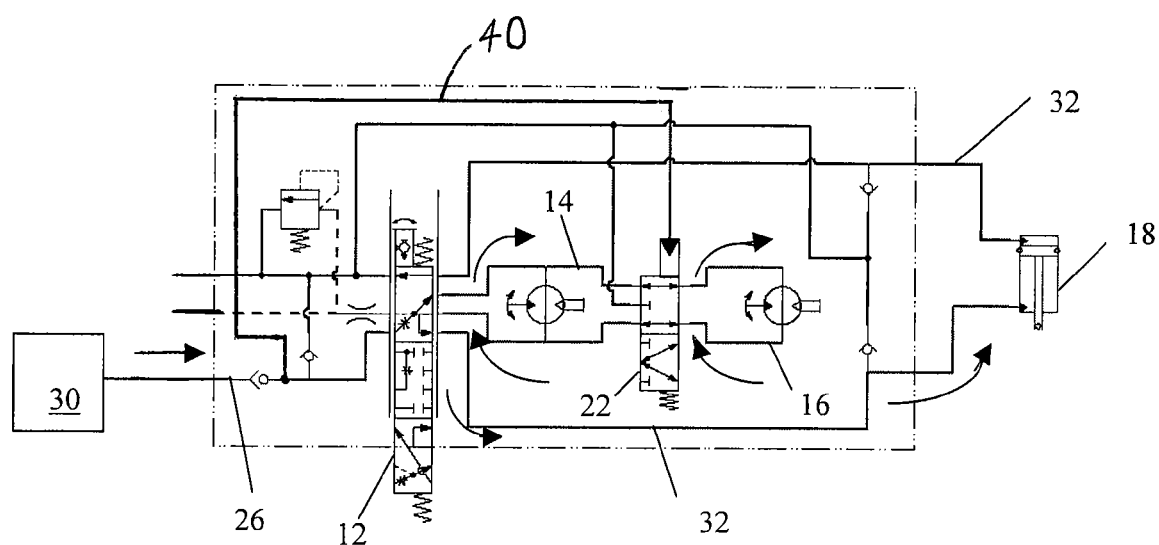
FIG. 7 is a diagrammatic view showing a portion of a prior art hydraulic system in which the hydraulic system steering is not under load.
Figure 8:
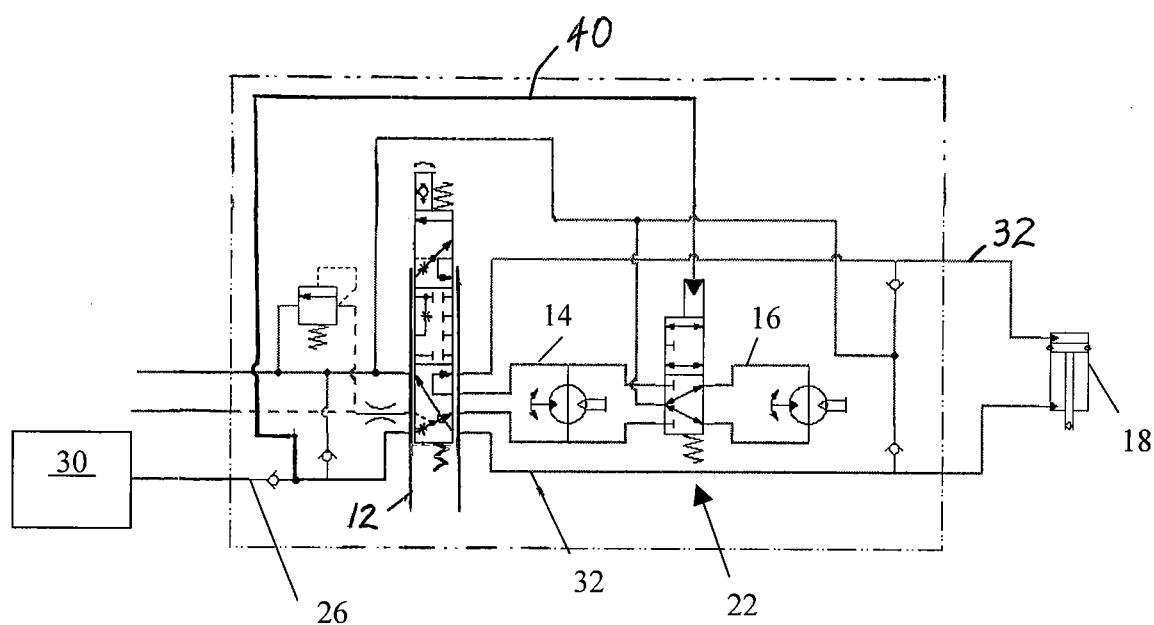
FIG. 8 is a diagrammatic view showing a portion of a prior art hydraulic system in which the hydraulic system is under load.

As diagrammatically shown in FIGS. 4-6, hydraulic system 10 includes a source 30, such as an accumulator, for providing fluid through various lines and components to a steering cylinder 18 to provide steering for a vehicle. FIG. 4 represents a configuration in which no pressurized hydraulic fluid is provided to steering cylinder 18, such as when the steering device does not engage the hydraulic system 10. In other words, fluid from source 30 is in fluid communication with line 26, but does not flow through valve 12. Similarly, fluid in fluid communication with junction 24 and contained within line 28 that is disposed between junction 24 and component 20, such as a solenoid valve, does not flow through component 20. FIG. 4 represents the condition wherein the steering device is centered, i.e., not actuated toward a position that corresponds to a turning position, and therefore not placing a load or engaging the hydraulic system 10.

Component 20, such as a solenoid valve, can be actuated in different ways. For example, component 20 can be actuated in response to the loader being placed in a predetermined gear or upon the loader reaching a predetermined RPM in a predetermined gear, or the loader reaching a predetermined speed or a combination of any or all of these or other operating conditions. In addition, pilot line 34 can be activated (pressurized) to achieve the desired position of valve 22 in response to an operator's act or instruction or in response to a control signal generated by a computer or other device. It is further envisioned that such control can be effected by other arrangements of components, persons or devices remote from the loader or in response to other operating conditions or job site situations relating to safety or other reasons.

As shown in FIG. 5, fluid flows from source 30 through line 26 and valve 12, and to component 14, such as a gerotor, which meters pressurized fluid back through valve 12 then through line 32 to steering cylinder 18. The position of valve 12 is shifted with respect to line 26 by known techniques to permit the flow of fluid through valve 12 to component 14. However, fluid in fluid communication with junction 24 and line 28 cannot flow through component 20. FIG. 5 represents the condition wherein the steering device is actuated toward a position that corresponds to a turning position of the vehicle, and therefore, places a load or engages the hydraulic system 10.

As shown in FIG. 6, similar to FIG. 5, fluid from source 30 flows through line 26 and valve 12, is metered by component 14 and then directed back through valve 12 and provided through line 32 to steering cylinder 18. However, unlike FIG. 5, FIG. 6 shows fluid that is provided in fluid communication with junction 24 and line 28 flows through component 20, such as a solenoid valve, and through line 34 to valve 22. By virtue of pressurized fluid flow in line 34, valve 22 is then actuated so that component 16 is in fluid communication with component 14. As further shown in FIG. 6, components 14, 16 are disposed in a parallel construction. That is, fluid from line 26 which is not metered by component 14 flows through valve 22 and received by component 16 for directing combined metered flow back through valve 22 and is combined with metered flow by component 14, back through valve 12 and through line 32 to steering cylinder 18. In one embodiment both components 14, 16 are gerotors and are similarly sized. However, it is to be understood that either/both of components 14, 16 can be gerotors, or other devices capable of providing metered pressurized flow of fluid. Further, components 14, 16 can be sized differently, and in another embodiment, not shown, there can be more than two components 14, 16 to provide metered pressurized flow of fluid to steering cylinder 18. FIG. 6 represents the condition of provided steering assist by supplementing the normally configured component 14 (for example, a gerotor) for providing additional pressurized fluid to steering cylinder 18.

It is appreciated that while the Figures are discussed to the extent of providing pressurized fluid flow to the steering cylinder 18 to effect steering in one direction, the hydraulic system can similarly be used to effect steering control in the other direction. Such steering control is effected by actuation of valve 12 to a different position with respect to the hydraulic system so that the direction of flow of fluid through different lines, such as line 32, is reversed. However, one skilled in the art can appreciate the usage of multiple valve arrangements in hydraulic systems to effect desired operations, so that these valve arrangements are not necessary for understanding of the invention and are not further discussed herein.

It is to be understood that as discussed in one embodiment, when valve 20 is opened so that gerotor 16 can work in parallel with gerotor 14, a reduced amount of movement or actuation of the steering device is required in order to achieve an amount of steering movement or change of direction of the vehicle. In other words, by virtue of the additional gerotor 16 in the hydraulic system 10, the load operator does not need to actuate the steering device to the same extent to achieve the same amount of steering movement. For example, in one embodiment in which only gerotor 14 is available, a vehicle operator must rotate a steering wheel 3 revolutions to achieve a steering movement from a neutral position to a lock position. However, in one embodiment of the hydraulic system 10 in which both gerotors 14, 16 are permitted to work together, the operator may only need to rotate the steering wheel about 1½ revolutions to achieve a steering movement from the neutral position to a lock position. Stated another way, the steering wheel is more responsive, and thus requires less movement and thus less motion required to steer the vehicle. It is to be understood that the steering assist could be configured to provide significantly more or significantly less than a 50 percent reduction in steering movement. Steering assist is increased by the provision of additional pressurized fluid through the hydraulic system to the steering cylinder 18. Likewise, steering assist is decreased by the provision of a reduced amount of pressurized fluid through the hydraulic system to the steering cylinder 18. In one embodiment having two or more gerotors or components each capable of providing metered pressurized fluid to the steering cylinder, it is appreciated that there can be multiple amounts of steering assist.

Multiple amounts of steering assist can also be referred to as multiple-steering speed. Stated another way, multiple-speed steering refers to the responsiveness of the steering system, or the magnitude of steering change occurring in relation to a given movement of the steering device.

It is desirable to travel between work sites at a higher gear than is typically possible while operating the off-road vehicle in a loading operation. It is to be understood that the configuration of hydraulic system 10 as shown in FIG. 5 corresponds to one mode of operation, such as road gear, or a higher gear in which the vehicle is capable of approaching top speeds. In road gear mode, reduced steering device sensitivity is highly desirable, as an over-sensitive steering device could result in unstable, and therefore, unsafe driving conditions. Therefore, in one embodiment, the operator is blocked, or unable to operate the vehicle in the mode of operation described in FIG. 6, when the vehicle is in road gear.

It is also to be understood that the configuration of hydraulic system 10 as shown in FIG. 6 corresponds to a mode of operation in which, as in one embodiment, both gerotors 14, 16 can be used together to enhance the responsiveness, i.e., reduce the amount of movement of the steering device in order to achieve a predetermined amount of steering movement. As previously discussed, one mode of operation capable of use with the steering assist feature is loading, which typically requires a great deal of steering device movement, with the vehicle operating at a lower drive gear, i.e., reduced speed of travel.

It is to be understood that while the term steering device can refer to a steering wheel, the term steering device is not intended to be so limiting, and can include a lever, toggle switch, optical adjustment feature usable with a human eye or other visual detection device or other construction usable to provide steering for a vehicle.

It is to be understood that the steering assist of the present invention can be used with alternate loader driving constructions, including but not limited to front axle steering, articulated steering, four wheel steering and crab steering, back wheel steering, back loading, reversible steer or other driving constructions that could similarly benefit from requiring a reduced amount of movement or actuation of a steering device is in order to achieve an amount of steering movement or change of direction of the vehicle. It is to be understood that "steering cylinder" may refer to multiple steering cylinders.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multiple-speed steering system for an off-road vehicle having a loading mechanism and a hydraulic steering system associated with guiding the vehicle, the multiple-speed steering system comprising:
   a hydraulic steering cylinder;
   a first component fluidly coupled to the steering cylinder to provide a primary metered flow of hydraulic fluid to the steering cylinder;
   a second component selectively fluidly coupled to the steering cylinder to provide a supplemental metered flow in addition to the primary metered flow of hydraulic fluid to the steering cylinder; and
   wherein addition of the supplemental metered flow is selectable by an operator of the vehicle.

2. The system of claim 1 wherein at least one of the first component and the second component is a pump.

3. The system of claim 1 wherein at least one of the first component and the second component is a gerotor.

4. The system of claim 1 wherein at least one of the second component is selectively fluidly coupled to the steering cylinder by a valve.

5. The system of claim 4 wherein the valve is a solenoid valve.

6. The system of claim 1 further includes a steering device associated with the hydraulic steering system for guiding the vehicle.

7. The system of claim 6 wherein the steering device is a steering wheel.

8. The system of claim 6 wherein the steering device is a lever.

9. The system of claim 6 wherein the steering device is a toggle switch.

10. A method for providing multiple-speed steering assist to an off-road vehicle having a loading mechanism, the vehicle having a hydraulic steering system associated with guiding the vehicle, including a hydraulic steering cylinder, the steps comprising:
    providing a first component fluidly coupled to the steering cylinder to provide a primary metered flow of hydraulic fluid to the steering cylinder;
    providing a second component selectively fluidly coupled to the steering cylinder to provide a supplemental metered flow in addition to the primary metered flow of hydraulic fluid to the steering cylinder; and
    selectably requesting addition of the supplemental metered flow.

11. The method of claim 10 wherein at least one of the first component and the second component is a pump.

12. The method of claim 10 wherein at least one of the first component and the second component is a gerotor.

13. The method of claim 10 wherein the second component is selectively fluidly coupled to the steering cylinder by a valve.

14. The method of claim 13 wherein the valve is a solenoid valve.

15. The method of claim 10 wherein selectably requesting includes actuation of a steering device associated with the hydraulic steering system for guiding the vehicle, wherein the steering device is a steering wheel.

16. The method of claim 15 wherein the steering device is a lever.

17. The method of claim 15 wherein the steering device is a toggle switch.

18. A multiple-speed steering system for an off-road vehicle having a loading mechanism and a hydraulic steering system associated with guiding the vehicle, the multiple-speed steering system comprising:
    a hydraulic steering cylinder;
    a first pump fluidly coupled to the steering cylinder to provide a primary metered flow of hydraulic fluid to the steering cylinder;

a second pump selectively fluidly coupled to the steering cylinder to provide a supplemental metered flow in addition to the primary metered flow of hydraulic fluid to the steering cylinder; and wherein addition of the supplemental metered flow is selectable by an operator of the vehicle.

19. The system of claim 18 wherein at least one of the first pump and the second pump is a gerotor.

20. A steering system for an off-road vehicle having a loading mechanism and a hydraulic steering system associated with guiding the vehicle and including a hydraulic steering cylinder, the system comprising:

a first steering ratio for use with a first mode of operation of the vehicle, the first steering ratio corresponding to a first metered flow of fluid produced by a metering mechanism and transmitted to the steering cylinder, the first steering ratio defining an amount of movement of a steering device corresponding to an amount of change of direction of the vehicle, the magnitude of the change of direction capable of being less than lock to lock movement; and a second steering ratio for use with a second mode of operation of the vehicle, the second steering ratio corresponding to a second metered flow of fluid produced by the metering mechanism and transmitted to the steering cylinder, the second metered flow of fluid greater than the first metered flow of fluid, the second steering ratio defining an amount of movement of the steering device corresponding to an amount of change of direction of the vehicle, the magnitude of the change of direction capable of being less than lock to lock movement.

\* \* \* \* \*